(No Model.)
R. T. WOLISTON & S. W. PRINTZ.
THILL COUPLING.
No. 276,120.                     Patented Apr. 17, 1883.
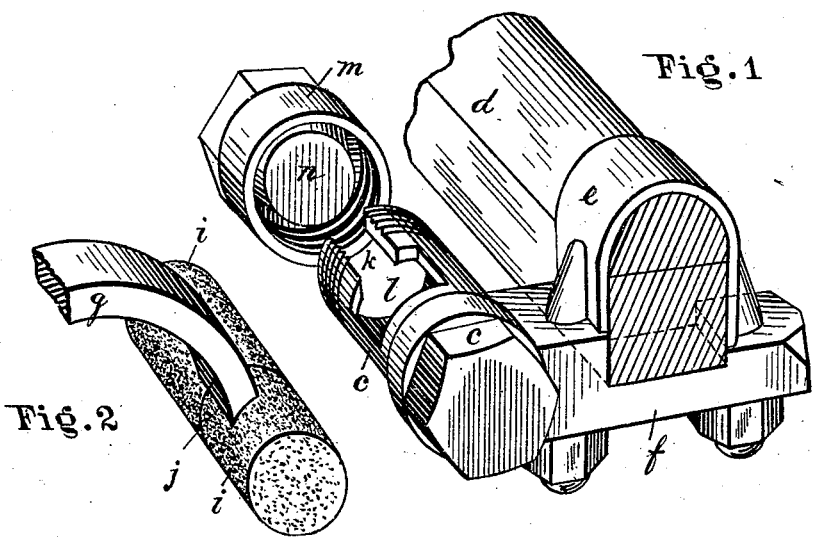
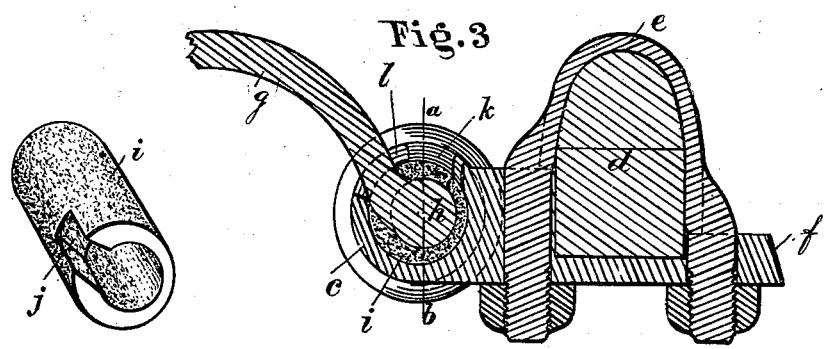
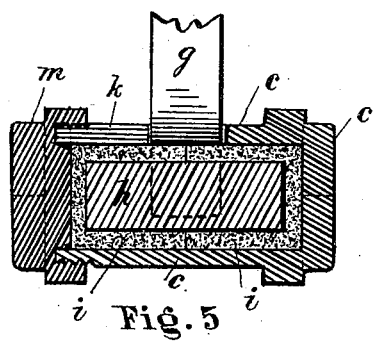
Attest
O. D. Brown
A. L. Wolley.
Romanus T. Woliston
Silas W. Printz
Inventors
by
Henry Millward
their attorney

UNITED STATES PATENT OFFICE.

ROMANUS T. WOLISTON AND SILAS W. PRINTZ, OF BONANZA, COLORADO.

THILL-COUPLING.

SPECIFICATION forming part of Letters Patent No. 276,120, dated April 17, 1883.

Application filed October 31, 1882. (No model.)

*To all whom it may concern:*

Be it known that we, ROMANUS T. WOLISTON and SILAS W. PRINTZ, of Bonanza, county of Saguache, State of Colorado, have invented a new and useful Improvement in Thill-Couplings, of which the following is a specification.

In the accompanying drawings, Figures 1 and 2 are perspective views of a thill-coupling of our invention. Fig. 3 is a transverse sectional elevation of the same. Fig. 4 is a perspective view of one-half of the rubber envelope that covers the hinge portion of the thill-iron; and Fig. 5 is a longitudinal sectional elevation taken through line $a\ b$ of Fig. 3.

The present invention consists in a thill-coupling provided with a T-shaped thill-iron having a rubber-enveloped joint, upon which the shaft of a vehicle may oscillate for a limited distance by means of an aperture in the cylindrical casing of said joint, entirely free from noise.

It further consists in combinations and arrangements of parts whereby the aforesaid noiseless movement is practically accomplished.

In the drawings letters of like character represent corresponding parts in each of the figures.

In order that others skilled in the art to which our invention belongs may make and use the same, we will proceed to describe its construction and operation.

Two cylindrical casings, $c$, are attached to the customary axle, $d$, of a vehicle through the agency of clips $e$, that extend around the aforesaid axle in the manner shown, and then terminate in threaded ends, that pass through perforations in the horizontal extensions $f$ of the cylindrical casings $c$, where they are secured by nuts in the usual manner.

Each thill-iron $g$ is provided with a joint, $h$, that we completely envelop with a rubber jacket, $i\ i$. This jacket is preferably made in two parts for convenience of construction, and each half is provided with a slot, $j$, that fits over the thill-iron $g$ in a manner suitable for the complete covering of its joint $h$. The joint $h$, after being properly jacketed, is inserted endwise into the cylindrical casing $c$, the slot $k$ in said casing forming a passage-way to permit of this being done. This slot $j$ extends into the aforesaid casing to make connection with an aperture, $l$, in which the thill-iron $g$ has a vertical oscillatory motion. After the thill-iron $g$ is inserted into the cylindrical casing $c$, a nut, $m$, is fitted over the threaded end of said casing and retains it in place. The nut $m$ is provided with a tapering projection, $n$, that enters the bore of the casing $c$, and through the agency of the slot $k$ expands the casing outwardly until the nut $m$ is completely locked.

It is obvious that the rubber casing $i\ i$ may be made in more than two parts without departing from the spirit of this invention; also that the projection $n$ on the nut $m$ could be dispensed with and yet made to answer the purpose for which this was intended.

In case of the wearing of the rubber jacket a liner of any kind may be put into the casing $c$ at either end, and thus compensate for the wear by the pressure of the nut against said liner rubber jacket, causing the expansion of the whole jacket to the filling of its cylindrical casing.

We have represented the rubber jacket as perforated eccentrically for the reception of the joint $h$. This we do so as to place an excess of rubber in front of the thill-iron joint. We do not wish to be confined to the precise shape of the thill-iron joint, as a ball-joint may be used in place of a T-joint.

Having thus described our invention, what we claim as new, and desire to secure by Letters Patent, is—

1. A thill-coupling consisting of a T-shaped thill-iron, forming a joint upon which the shafts of a vehicle may oscillate, and having said joint completely enveloped in a rubber jacket, a cylindrical casing suitably apertured for the reception and limited movement of the aforesaid thill iron and joint, and a nut fitting over and screwing on the end of said casing for the proper confinement of said rubber-enveloped joint.

2. A thill-coupling consisting of a thill-iron, forming a joint upon which the shafts of a vehicle may oscillate, and having said joint completely enveloped with rubber, a cylindrical casing suitably apertured for the reception and limited movement of said thill iron and joint, and a nut having a tapering projection that fits into the aforesaid apertured cylinder and expands it until securely locked.

3. In a thill-coupling, a slotted casing for the reception of a thill-iron, $h\ g$, in combination with a nut, $m\ n$, substantially as and for the purpose specified.

4. In a thill-coupling, a rubber jacket, $i\ i$, made in two parts suitably for the complete covering of the thill-iron joint $h$, substantially as and for the purpose specified.

In testimony whereof we have hereunto set our hands this 27th day of October, 1882.

ROMANUS T. WOLISTON.
  SILAS W. PRINTZ.

Witnesses:
 CONRAD SPARGENBARGER,
 JAS. JOHNSON, Jr.